United States Patent
Wu et al.

(10) Patent No.: US 8,428,787 B2
(45) Date of Patent: Apr. 23, 2013

(54) ELECTRONIC DEVICE AND POWER MANAGEMENT METHOD THEREOF

(75) Inventors: Yu-Feng Wu, Taipei County (TW); Wen-Cheng Hus, Taipei County (TW)

(73) Assignees: Inventec Appliances (Shanghai) Co., Ltd., Shanghai (CN); Inventec Appliances Corp., Taipei County (TW)

( * ) Notice: Subject to any disclaimer, the term of this patent is extended or adjusted under 35 U.S.C. 154(b) by 206 days.

(21) Appl. No.: 13/004,003

(22) Filed: Jan. 10, 2011

(65) Prior Publication Data

US 2011/0172843 A1   Jul. 14, 2011

(30) Foreign Application Priority Data

Jan. 12, 2010   (CN) .......................... 2010 1 0003585

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)
*G06F 1/00* (2006.01)
*G06F 11/30* (2006.01)
*H04M 1/00* (2006.01)
*H04B 1/38* (2006.01)

(52) U.S. Cl.
USPC ........... 700/295; 700/292; 700/297; 713/324; 713/330; 713/340; 455/574

(58) Field of Classification Search .................. 700/286, 700/292, 293, 295, 297, 298; 713/300, 320, 713/324, 330, 340; 455/73, 550.1, 572, 574; 320/124, 125, 127, 137; 358/1.1, 1.14, 1.15
See application file for complete search history.

(56) References Cited

U.S. PATENT DOCUMENTS

| | | | | |
|---|---|---|---|---|
| 5,638,540 A | * | 6/1997 | Aldous | 713/300 |
| 7,286,251 B2 | * | 10/2007 | Tomida et al. | 358/1.15 |
| 7,412,622 B2 | * | 8/2008 | Nishikawa | 714/14 |
| 7,447,757 B2 | * | 11/2008 | Muto | 709/223 |
| 7,839,121 B2 | * | 11/2010 | Kim | 320/124 |
| 7,868,483 B2 | * | 1/2011 | Lu et al. | 307/85 |
| 7,965,399 B2 | * | 6/2011 | Miyamoto | 358/1.14 |
| 8,030,880 B2 | * | 10/2011 | Alston et al. | 320/103 |
| 2005/0118472 A1 | * | 6/2005 | Yang et al. | 429/23 |
| 2007/0001694 A1 | * | 1/2007 | Jahagirdar et al. | 324/760 |
| 2008/0045275 A1 | * | 2/2008 | Le | 455/572 |
| 2008/0193584 A1 | * | 8/2008 | Cooke | 425/143 |
| 2012/0155945 A1 | * | 6/2012 | Ogushi | 400/76 |

FOREIGN PATENT DOCUMENTS

| | | | | |
|---|---|---|---|---|
| EP | 1542308 A2 | * | 6/2005 | |
| JP | 2008132647 A | * | 6/2008 | |
| JP | 2008193219 A | * | 8/2008 | |

* cited by examiner

*Primary Examiner* — Crystal J Barnes-Bullock
(74) *Attorney, Agent, or Firm* — WPAT, P.C.; Anthony King

(57) ABSTRACT

The present invention discloses an electronic device having a power management module and a power management method thereof. Within the power management method is used for an electronic device, which has a first power module, a second power module and the loads. The power management method comprises the following step: (1) monitoring the first power module and the second power module; (2) if the first power module and the second power module are activated at the same time, sequentially stopping a supply of electric power to at least one of the loads until the electronic device has total load current smaller than a reference value.

16 Claims, 2 Drawing Sheets

ELECTRONIC DEVICE AND POWER MANAGEMENT METHOD THEREOF

FIELD OF THE INVENTION

The present invention relates to a power management method. More specifically, the present invention relates to an electronic device having a power management module and a power management method thereof.

BACKGROUND OF THE INVENTION

As science and technology advance in recent years, a single electronic device can achieve more and more diversified functions. For example, electronic components which have functions like printing, audio/video display, touch input, audio, wireless communication, or others function corresponding to itself are integrated into a single multifunctional electronic device. Hence, a good power management is very important to ensure an electronic device work normally under a stable power supply or to even achieve the goal of energy conservation.

For example, these days logistics industry often adopts an appropriative electronic point-of-sale system (POS) to manage or to assist selling commercial products at stores. It is usual that the POS can be applied to cash registers and interactive selling systems (or interactive selling machine such as ibon and FamiPort).

After the standard of barcodes was established in 1970s, manufacturers print a barcode on a product before it leaving the factory. It is one of application for the POS system that a store keeper can use barcodes to manage goods. Recently, the POS informative system gradually functions like a personal computer. The structure of a personal computer is utilized to do with files, manage stock and customer information, swipe cards, and validate data et cetera.

In the present POS system, it has printing modules (such as a thermal printer) for printing receipts or invoices, wireless communication modules for transmitting the information of goods and orders, displayers, touch panels, audio players, processors, barcode identification modules and other essential electronic components together.

Practically, a power supply used in an electronic device (such as a POS system) generally has a maximum power (such as 350 W~400 W for an electronic device under a computer architecture) to meet the power-saving and safety requirements. In a system with a constant voltage, if the various components (e.g., a printing module, a wireless communication module, an audio player, etc.) in an electronic device are activated at the same time, then the total load current of the electronic device are increased instantaneously. In this moment, if the inrush current of the total loads exceeds the maximum, the electronic device may be crushed or even damaged permanently.

Therefore, the present invention offers a portable electronic device to solve the problem as mentioned previously.

SUMMARY

An object of the present invention is to provide a power management method, and specifically a power management method for use in an electronic device.

When an electronic device has a first power module, a second power module and loads, the power management method of the invention for use in the electronic device comprises steps of: monitoring the first power module and the second power module; and if the first power module and the second power module are activated at the same time, sequentially stopping a supply of electric power to at least one of the loads until the electronic device has total load current less than a reference value.

In addition, the power management method may further comprise a step of beginning a supply of electric power to the loads if one of the power modules is not activated.

Specifically, the above step of sequentially stopping a supply of electric power to the loads may be performed according to a priority order in which the loads' electric power supply is to be stopped.

Another aspect of the present invention provides a power management method for use in an electronic device having a printing module, a wireless communication module and loads. The power management method comprises steps of: monitoring the printing module and the wireless communication module; and if the printing module and the wireless communication module are activated at the same time, sequentially stopping a supply of electric power to at least one of the loads, until the electronic device has total load current less than a reference value.

In addition, the power management method may further comprise a step of beginning a supply of electric power to the loads if one of the printing module or the wireless communication module is not activated.

Also in addition, the power management method may further comprise a step of determining whether or not the printing module is activated according to an interrupt produced by the printing module.

Another object of the present invention is to provide an electronic device. The electronic device of the invention has a first power module, a second power module, loads and a power management module. The power management module is coupled to the first power module, the second power module and the loads in order to monitor the first power module and the second power module. And if the first power module and the second power module are activated at the same time, the power management module is used to sequentially stop a supply of electric power to at least one of the loads until total load current of the electronic device is smaller than a reference value.

In the electronic device, the first power module may comprise a printing module. The second power module may comprise a wireless communication module.

In the electronic device, the power management module may enable beginning a supply of electric power to the loads if one of the first power module or the second power module is not activated.

In the electronic device, the power management module may determine whether the first power module is activated or not according to an interrupt produced by the first power module.

In the electronic device, if the first power module and the second power module are activated at the same time, the power management module may be used to sequentially stop a supply of electric power to the loads according to a priority order in which the loads' electric power supply is to be stopped.

Compared with the electronic devices in the prior art, the present invention provides an electronic device having a power management module, and a power management method thereof. In the electronic device, when two or more power modules are activated simultaneously, the power management module in the present invention can be used to sequentially stop supplying power to the loads which are considered as having lower priority in a priority order, or which are determined automatically. Therefore, some loads will be closed until total load current of the electronic device is less than a reference value to ensure that the electronic device works stably.

The advantages and spirit of the present invention can be further understood by referring to the following detailed description of embodiments of the invention and the accompanying drawings.

DETAILED DESCRIPTION OF THE PREFERRED EMBODIMENTS OF THE INVENTION

Figure 1:
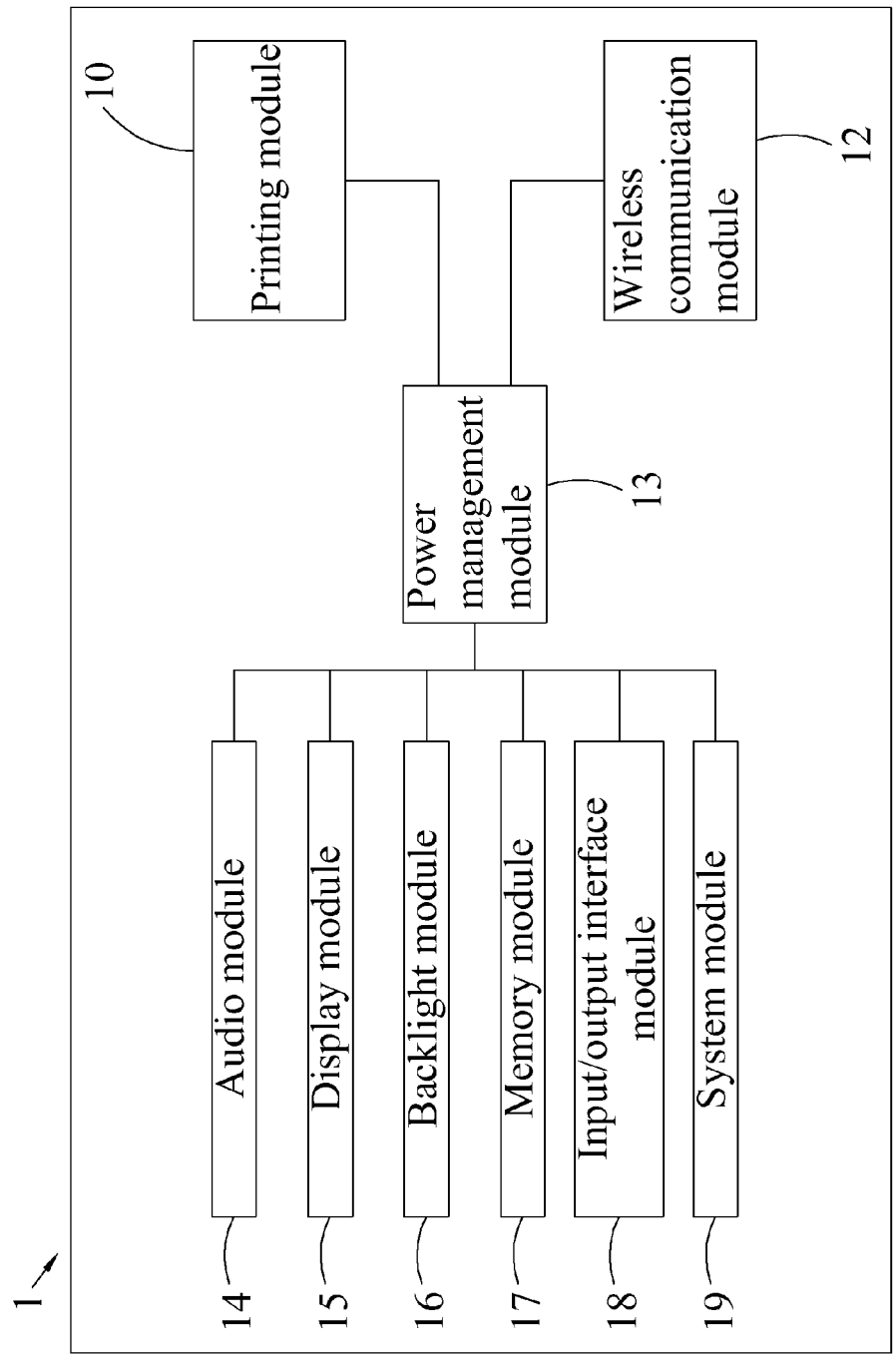
FIG. 1 shows a block diagram of an electronic device in accordance with an embodiment of the present invention.

Please refer to FIG. 1. FIG. 1 shows a block diagram illustrating an electronic device 1 in accordance with an embodiment of the present invention. The electronic device 1 comprises at least a first power module, a second power module, loads, and a power management module 13. It should be noted that the terms "first power module" and "second power module" used in this application both may typically mean a module that is operated mechanically or electrically. In the electronic device of the invention, the power management module is coupled to the first power module, the second power module and the loads, for monitoring the first power module and the second power module. Further, if the first power module and the second power module are activated at the same time, the power management module is used to sequentially stop a supply of electric power to at least one of the loads until total load current of the electronic device is smaller than a reference value.

The loads may be devices to which power is delivered, or that use power. In this embodiment, the two power modules in the electronic device 1 are, for example, a printing module 10 and a wireless communication module 12 respectively. The loads can respectively comprise, for example, an audio module 14, a display module 15, a backlight module 16, a memory module 17, an input/output interface module 18, and a system module 19, which may be a processing module or a controlling module. Various loads with different functions for applications can be in the electronic device, without limiting the scope of the invention.

The power management module 13 in the electronic device 1 is coupled to the printing module 10, the wireless communication module 12 and these loads as mentioned previously (an audio module 14, a display module 15, a backlight module 16, a memory module 17, an input/output interface module 18, and a system module 19). The power management module 13 is used for managing the status of power supply to those above-mentioned modules (the status may be of e.g., power-on, standby, power-off or shutdown, supplied power, voltage, or current). Further, the power management module 13 is used for monitoring the printing module 10 and the wireless communication module 12. It's noted that in an embodiment of the electronic device of the invention the power management module may monitor the first power module and the second power module. In this embodiment, the power management module 13 can detect and monitor the status of the printing module 10 (e.g., warming up, printing or standby) and the wireless communication module 12 (e.g., transmission started, interrupted or stopped) at the same time.

For example, in practical applications, the printing module 10 can comprise a thermal printer, and the wireless communication module 12 can comprise a modem (e.g., General Packet Radio Service, Global System for Mobile communications, Code Division Multiple Access). Generally, the printing module 10 and the wireless communication module 12 are power modules with higher energy consumption compared to the others in an electronic device. In other words, on condition that the voltage of system is fixed, when the printing module 10 and the wireless communication module 12 are activated, it will cause that the total load current of the electronic device becomes larger.

Practically, the respective average values of the maximum currents reflecting energy consumption of several important components in the electronic device may be those shown in the following table 1:

TABLE 1

| Name of electronic components | The average value of the maximum current when the component is activated [mA] |
| --- | --- |
| thermal printer | 2600 |
| modem | 600 |
| Audio processing chip | 1000 |
| display panel | 200 |
| backlight module | 400 |
| core system chip | 450 |
| USB hub | 343 |
| Ethernet controller | 175 |

As shown in the table 1, in general situations, the printing module 10 and the wireless communication module 12 are higher power modules compared to the others in an electronic device. If the two are activated at the same time, the total load current of the electronic device 1 may substantially increase. For example, when the printing module 10 (e.g., thermal printer) of the electronic device 1 is operating to print receipt or form for customer and transmit the record to the external server by the wireless communication module 12 (e.g., modem), the total load current of the electronic device 1 may become so higher that the system will be unstable. The power management module of the present invention is used for avoiding the situation that the system becomes unstable.

In this embodiment, when the power management module 13 interprets that the printing module 10 and the wireless communication module 12 are activated at the same time, it will sequentially stop supplying power to the loads at least one until the total load current of the electronic device is smaller than a reference value.

For example, when the printing module 10 operates to begin printing, the power management module 13 can determine whether or not the printing module is activated according to an interrupt produced by the printing module.

In this embodiment, according to a priority order in which the loads' electric power supply is to be stopped, the power management module 13 can be used to sequentially stop supplying power to at least one of the loads (an audio module 14, a display module 15, a backlight module 16, a memory module 17, an input/output interface module 18, and a system module 19) until the total load current of the electronic device is smaller than a reference value.

For example, the power management module 13 can temporarily stop supplying power to the audio module 14 (e.g., an audio processing chip), then it will detect the total load current of the electronic device 1 which was adjusted. If the total load current is still greater than the reference value, the power management module 13 can further stop supplying power to the input/output interface module 18 (e.g., an USB hub). And so on, it will not stop the action until the total load current is less than a reference value stably.

In this embodiment, although it takes the printing module 10 and the wireless communication module 12 as example for they are relatively higher power modules compared to others in an electronic device, they are not intended to limit the scope of the present invention. In other embodiment, the power management module 13 can also be applied to detect and monitor either the first power module or the second power module, and then the same effect as mentioned above can also be reached.

Figure 2:
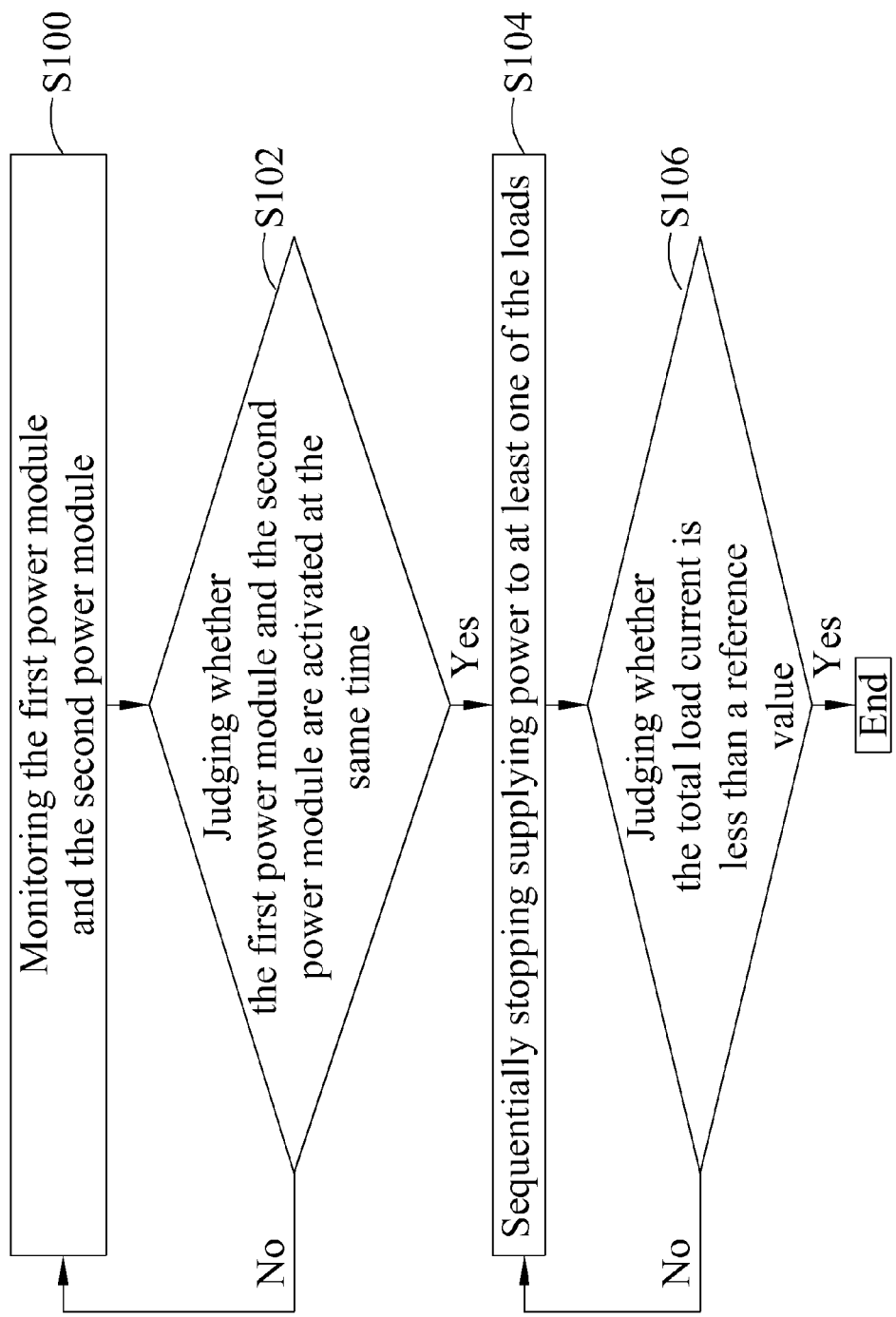
FIG. 2 shows a flow chart of the power management method in accordance with another embodiment of the present invention.

Besides, the present invention also provides a power management method, which is used for managing the power supply in an electronic device. Please refer to FIG. 2. FIG. 2 shows a flow chart of the power management method in accordance with another embodiment of the present invention.

In this embodiment, the power management method can be applied to the electronic device as mentioned in the previous embodiment. The electronic device 1 has a first power module, a second power module, loads, and a power management module. For the more detailed structure of the electronic device 1, please refer to the embodiment as mentioned previously As shown in the FIG. 2, the step S100 of the power management method of the present invention is performed first, which step S100 is monitoring the first power module and the second power module, for example by the power management module.

Then the step S102 is performed, which step S102 is judging whether or not the first power module and the second power module are activated at the same time, for example by the power management module. If yes, then the step S104 is performed, which step S104 is stopping a supply of electric power to at least one of the loads, for example by the power management module. Practically, the step S104 may be sequentially stopping a supply of electric power to at least one of the loads according to a priority order in which the loads' electric power supply is to be stopped.

Then the step S106 is performed, which step S106 is judging whether the total load current is smaller than a reference value, for example by the power management module. If not, then the step S104 is performed again to stop supplying power to another load until judging that the total load current is smaller than a reference value in the next step S106. Therefore, the power management method can prevent the total load current from instantaneously excessively surging up when a plurality of relatively high power modules are activated simultaneously.

In addition, the power management method may further comprise a step of beginning a supply of electric power to the loads if one of the first power module or the second power module is not activated.

In another embodiment when the first power module and the second power module can comprise a printing module 10 and a wireless communication module 12 respectively, the power management method of the invention comprises steps of: monitoring the printing module 10 and the wireless communication module 12, for example by a power management module 13; and if the printing module 10 and the wireless communication module 12 are activated at the same time, sequentially stopping a supply of electric power to at least one of the loads, until the electronic device 1 has total load current smaller than a reference value. Detailed description of embodiments of the power management method comprising these steps can be substantially the same as the above description of the above electronic device and the previous power management method of the present invention, so it will not be repeated again. Practically, the power management method may further comprise a step of determining whether or not the printing module 10 is activated according to an interrupt produced by the printing module 10. And one of the loads may comprise an audio module, a display module, a backlight module, a memory module, an input/output interface module, or a system module. Therefore, the power management method can prevent the total load current from instantaneously excessively surging up when a plurality of relatively high power modules are activated simultaneously.

In summary, the present invention includes the electronic device having the power management module, and the power management method. In the electronic device, when two or more power modules are activated simultaneously, the power management module 13 of the present invention can be used to sequentially stop supplying power to the loads which are considered as having lower priority in a priority order, or which are determined automatically. By this method, some loads will be closed until total load current of the electronic device is smaller than a reference value, to ensure that the electronic device works stably.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiments of the present invention.

What is claimed is:

1. A power management method for use in an electronic device having a first power module, a second power module and loads, the power management method comprising steps of:

monitoring the first power module and the second power module; and if the first power module and the second power module are activated at the same time, sequentially stopping a supply of electric power to at least one of the loads until the electronic device has total load current smaller than a reference value;

wherein the first power module and the second power module comprise a printing module and a wireless communication module respectively.

2. The power management method of claim 1, further comprising a step of beginning a supply of electric power to the loads if one of the power modules is not activated.

3. The power management method of claim 1, wherein the step of sequentially stopping a supply of electric power to the loads is performed according to a priority order in which the loads' electric power supply is to be stopped.

4. The power management method of claim 1, wherein one of the loads comprise an audio module, a display module, a backlight module, a memory module, an input/output interface module, or a system module.

5. A power management method for use in an electronic device having a printing module, a wireless communication module and loads, the power management method comprising steps of:

monitoring the printing module and the wireless communication module; and if the printing module and the wireless communication module are activated at the same time, sequentially stopping a supply of electric power to at least one of the loads, until the electronic device has total load current smaller than a reference value.

6. The power management method of claim 5, further comprising a step of beginning a supply of electric power to the loads if one of the printing module or the wireless communication module is not activated.

7. The power management method of claim 5, further comprising a step of determining whether or not the printing module is activated according to an interrupt produced by the printing module.

8. The power management method of claim 5, wherein the step of sequentially stopping a supply of electric power to the loads is performed according to a priority order in which the loads' electric power supply is to be stopped.

9. The power management method of claim 5, wherein one of the loads comprises an audio module, a display module, a backlight module, a memory module, an input/output interface module, or a system module.

10. An electronic device, having:
a first power module;
a second power module;
loads; and
a power management module, coupled to the first power module, the second power module and the loads, for monitoring the first power module and the second power module, wherein if the first power module and the second power module are activated at the same time, the power management module is used to sequentially stop a supply of electric power to at least one of the loads until total load current of the electronic device is smaller than a reference value;
wherein the first power module comprises a printing module, and the printing module comprises a thermal printer.

11. The electronic device of claim 10, wherein the second power module comprises a wireless communication module.

12. The electronic device of claim 11, wherein the wireless communication module comprises a modem.

13. The electronic device of claim 10, wherein the power management module enables beginning a supply of electric power to the loads if one of the first power module or the second power module is not activated.

14. The electronic device of claim 10, wherein the power management module determines whether or not the first power module is activated according to an interrupt produced by the first power module.

15. The electronic device of claim 10, wherein if the first power module and the second power module are activated at the same time, the power management module is used to sequentially stop a supply of electric power to the loads according to a priority order in which the loads' electric power supply is to be stopped.

16. The electronic device of claim 10, wherein one of the loads comprises an audio module, a display module, a backlight module, a memory module, an input/output interface module, or a system module.

* * * * *